(No Model.)
E. R. FULLER & J. D. SEAGRAVE.
FILTERING APPARATUS FOR WATER AND SEWAGE.
No. 259,754. Patented June 20, 1882.
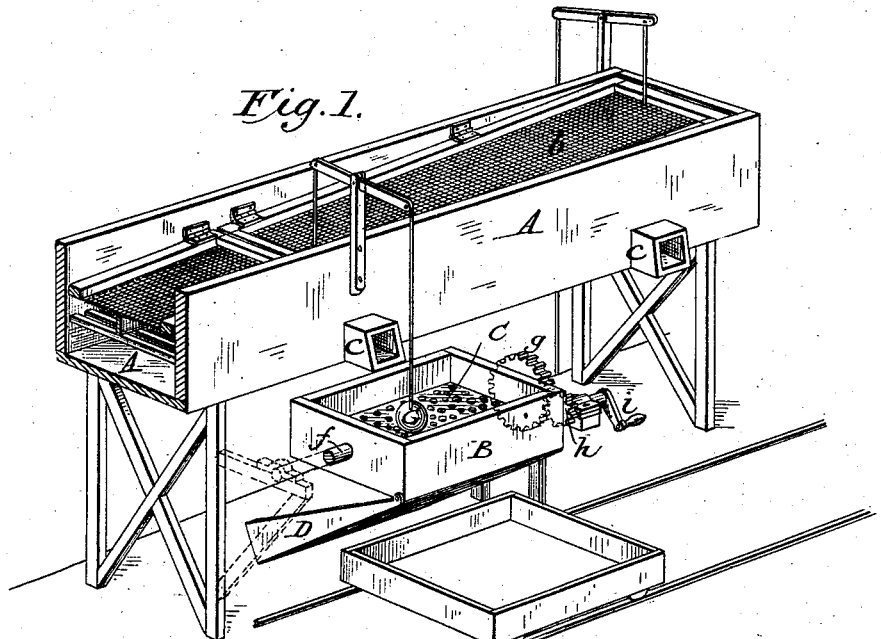
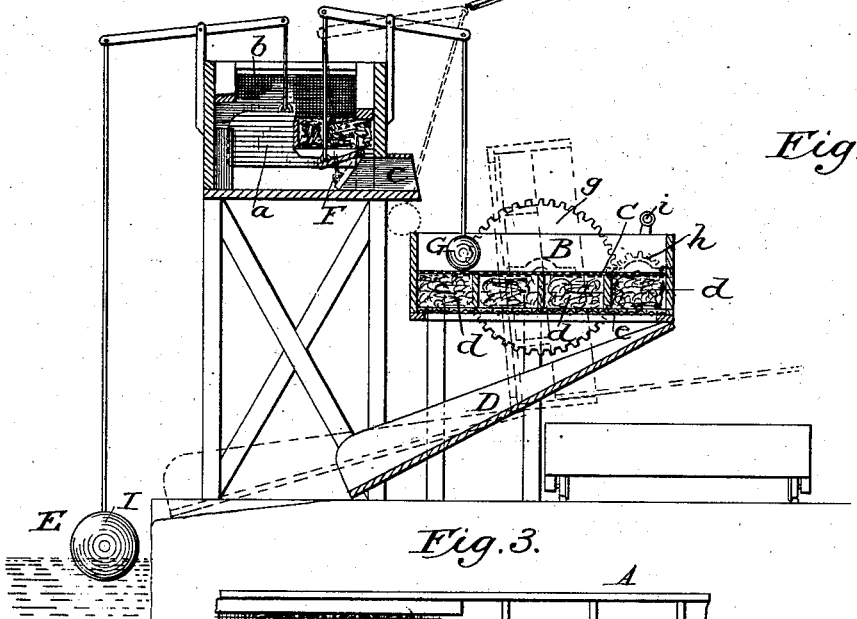
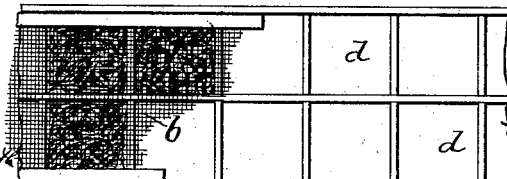
Attest.
Sidney P. Hollingsworth
Walter S. Dodge
Inventors.
Eustis R. Fuller
John D. Seagrave,
by Dodge Son,
Attys.
N. PETERS, Photo-Lithographer, Washington, D. C.

UNITED STATES PATENT OFFICE.

EUSTIS R. FULLER AND JOHN D. SEAGRAVE, OF WORCESTER, MASS.

FILTERING APPARATUS FOR WATER AND SEWAGE.

SPECIFICATION forming part of Letters Patent No. 259,754, dated June 20, 1882.

Application filed February 1, 1882. (No model.)

*To all whom it may concern:*

Be it known that we, EUSTIS R. FULLER and JOHN D. SEAGRAVE, of Worcester, in the county of Worcester and State of Massachusetts, have invented certain Improvements in Filtering Apparatus, of which the following is a specification.

Our invention relates to filtering apparatus designed for filtering water or sewage on a large scale; and it consists in a flume provided with an inlet and with outlets to supply water to the filtering boxes or chambers, and having an inclined filtering top through which water may pass in case of flood; in a tipping filter-box divided into compartments to contain the filtering material, and furnished with a hinged perforate cover or top for said compartments, which may be raised to discharge the material deposited thereon; in a chute attached at one side to the filter-box and serving to direct the filtered water to its proper point of discharge; in mechanism for tipping or dumping the filter-box; in float-valves adapted and arranged to control the supply of water, and in other features and details hereinafter explained.

In the accompanying drawings, Figure 1 represents a perspective view of our improved filtering apparatus; Fig. 2, a transverse vertical section of the same, and Fig. 3 a plan view of the flume.

The object of this invention is to provide at a comparatively small cost efficient means for purifying water for supplying towns, &c., or for treating sewage, purifying its water, and preventing the great destruction of fish and fouling of streams, while at the same time utilizing such matter as is suitable for fertilizing purposes. With this object in view we construct our filtering apparatus or works as shown in the drawings, in which—

A represents a flume, through which the water is brought to the filtering apparatus from any convenient point, said flume being furnished with an inlet-gate, *a*, at one end of the apparatus and closed at the other end, and being also provided with an inclined filtering top or cover, *b*, through which water may escape in case the outlets *c* of the flume are insufficient to carry off the water entering the flume. This filtering-top is constructed as represented in Figs. 1, 2, and 3, its under side being slatted or grated, its top covered with wire netting, perforated metal, or equivalent material, and the intervening space being divided into compartments, which are supplied with straw, "excelsior," charcoal, or other suitable filtering material. The filtering-top is more especially designed for use when the apparatus is intended for filtering sewage, the overflow-water of water-supplies being usually allowed to escape, instead of passing into the supply-mains. By thus dividing the filtering-top into small compartments the material placed therein can be kept in position without difficulty, and be maintained of uniform thickness, removed or replenished easily and quickly, or the character of the materials may be varied in different parts of the apparatus.

The flume will be of considerable length, width, and depth, depending, however, upon the circumstances of each case in which the apparatus is employed. From the flume the water or sewage, as the case may be, escapes through outlet-spouts *c* into the filtering box or boxes B, which are constructed in the same manner, essentially, as the filtering-top *b* of the flume A, except that the filtering-body is at the bottom of the box instead of at the top; or, in other words, the box is divided into compartments *d*, is furnished with a grated or slatted bottom, *e*, and is provided with a perforated plate or cover, C, resting across the top of the compartments, and hinged at its side or edge, as shown, in order that it may be turned up to expose the filtering material and to discharge the material deposited upon it.

The plate or cover C may be of perforated sheet metal, heavy wire netting, wooden slats, or other suitable material, though heavy sheet metal is preferred. The water pouring into the box or boxes B percolates through the filtering material and passes out through the slatted bottom purified and deprived of foreign matters of all kinds, and falls upon a chute or board, D, hinged or jointed to the box B at one side, as shown. The lower edge of the chute or board extends to the side of the reservoir E or its supply-chute, or slightly beyond, so as to direct the water into the same.

In order that the box B may be emptied or relieved at any time of the material deposited therein, it is hung upon trunnions or journals *f*, as shown, and as the box is of large size and very considerable weight, one of the said journals or trunnions is furnished with a gear-wheel, g, which meshes with a pinion, h, provided with a hand-crank, i, or equivalent means for turning it. By turning the handle the gearing is caused to swing the box upon its trunnions with the use of very little power. As the box tips upon its journals the chute D slides forward at its lower edge, and, passing over the edge of the reservoir, still serves to direct thereto any water that may find its way through the box. When the box is thus tipped the plate or cover C is raised, as indicated, and the deposit thrown out into a car or receptacle placed to receive it. The plate and the box are then restored to their normal positions and the apparatus is again ready for operation.

In order that the water may not flow into the filter-boxes when they become choked up and cease to act efficiently or properly, each spout c is furnished with a valve, F, controlled and operated by a float, G, which hangs within the filter-box, and is raised sufficiently to close the valve when the water rises above a given level therein. The same valve may be used to close the spout when the box is being emptied or cleaned, the float being raised and held up, as indicated.

For the purpose of regulating the quantity of water filtered in accordance with the demand therefor, a sliding gate, a, and float I are arranged to control the inlet through which water enters the flume, the float serving to automatically close or partially close the gate as the water rises in the reservoir.

The perforated top b of the flume is hinged or made otherwise removable, in order to permit the renewal or arrangement of the filtering material. This top, as also the plate C, serves to keep the filtering materials in place, and to prevent the weight of the deposit from being received thereby, and thus unduly compacting it.

It will of course be understood that we do not confine ourselves to any particular filtering materials, but may use any of those commonly employed, and where very fine materials are used fine netting may be employed above the slats to retain it in place.

The inclination of the top of the flume permits the water to flow through a small or large portion of the surface, according to the increase of the supply, and affords a fall to cause the water to flow off readily.

We are aware that a filter has been constructed in which the water entered at the bottom of the filtering-chamber and passed upward through the filtering material; and we are also aware that a filter has been provided with a branch pipe through which water could be drawn without being filtered, and these features we do not claim. We are not aware, however, that a supply pipe or flume of a filtering apparatus has ever before been furnished with a filtering-top or overflow by which the surplus water failing to pass through the regular outlets could be filtered.

We are aware that a steel "converter" used in the Bessemer process has been mounted upon trunnions and rocked or tipped by gearing similar to that employed for tipping our filter-box, and we do not specifically claim such mechanism; but we are not aware that a filtering apparatus has ever been thus arranged.

Having thus described our invention, what we claim is—

1. In a filtering apparatus, a supply-flume provided with one or more outlets and with a filtering-top or overflow, substantially as shown.

2. The flume A, provided with outlets c and inclined filtering-top b.

3. A filter-box divided into compartments, as shown and described, whereby the filtering material may be kept in position, varied, or renewed at any point, as described.

4. The herein-described filter-box, provided with a slatted or open bottom, divided into compartments and supplied with filtering materials, and furnished with a perforate plate above said compartments, as shown.

5. In a filtering apparatus, a filtering-box mounted upon trunnions, as shown and described, whereby it may be tipped to discharge the deposit therefrom.

6. In combination with the filter-box B, hung upon trunnions or journals f, the gear-wheel g, applied to one of said journals, and pinion h, meshing with said gear-wheel, and furnished with an operating crank or lever, substantially as shown and described.

7. A filter-box provided with a hinged perforate plate above the filtering material, substantially as and for the purpose set forth.

8. In combination with a tipping filter-box, a chute or board hinged thereto and extending to the receiving vessel or reservoir, substantially as and for the purpose explained.

9. In a filtering apparatus, the combination of a supply-flume, an outlet therefrom, a filter-box arranged to receive water from the outlet, a valve controlling said outlet, and a float located within the filter-box and connected with the valve, substantially as shown, whereby the float is caused to close the valve when the filter-box becomes choked or fails to permit the free escape of the water.

10. In a filtering apparatus, the combination of a supply-flume provided with an inlet-gate, a reservoir, and a float located within the reservoir and connected with the gate, substantially as shown, whereby it is adapted to control the supply of water to correspond with the demand.

EUSTIS R. FULLER.
JOHN D. SEAGRAVE.

Witnesses:
GEO. E. BOYDEN,
M. A. BOYDEN.